United States Patent [19]

Nishijima et al.

[11] Patent Number: 5,060,087
[45] Date of Patent: Oct. 22, 1991

[54] EDITING CIRCUIT FOR A MAGNETIC RECORDING AND REPRODUCING APPARATUS

[75] Inventors: Hideo Nishijima, Katsuta; Michio Masuda, Yokohama; Koichi Ono, Katsuta; Hiroyasu Ohtsubo, Yokohama, all of Japan

[73] Assignee: Hitachi, Ltd., Tokyo, Japan

[21] Appl. No.: 305,005

[22] Filed: Jan. 31, 1989

[30] Foreign Application Priority Data

Mar. 10, 1988 [JP] Japan .................................. 63-54803

[51] Int. Cl.$^5$ .......................................... H04N 5/782
[52] U.S. Cl. .................................. 360/14.1; 360/33.1; 358/311
[58] Field of Search ....................... 360/14.1, 13, 15.1, 360/32, 33.1, ; 358/182, 185, 75, 335

[56] References Cited

U.S. PATENT DOCUMENTS 4,706,135 11/1987 Kojima ............................... 360/14.1
4,899,229 2/1990 Hashimoto ......................... 360/14.1

Primary Examiner—Roy N. Envall, Jr.
Attorney, Agent, or Firm—Antonelli, Terry, Stout & Kraus

[57] ABSTRACT

In order to attain such editing that the fade in/fade out effect is obtained at a joint between scenes, an editing circuit for magnetic recording and reproducing apparatus includes memory for storing therein the last field (or one frame) of a video signal of a first scene recorded on magnetic tape, and operation processing circuit for adding an output signal obtained by repetitively reading out signals from the memory to a video signal of a second scene supplied from outside with proportions sucessively changed. The output signal of the operation processing circuit is supplied to the magnetic tape as a recording signal.

4 Claims, 5 Drawing Sheets

| FIELD (OR FRAME) | 0 | 1 | 2 | 3 | 4 | 5 | 6 | ... | n |
|---|---|---|---|---|---|---|---|---|---|
| a' | 1.0 | 0.75 | 0.56 | 0.42 | 0.32 | 0.24 | 0.18 | ... | 0.0 |
| b | 0.0 | 0.25 | 0.44 | 0.58 | 0.68 | 0.76 | 0.82 | ... | 1.0 |

EDITING CIRCUIT FOR A MAGNETIC RECORDING AND REPRODUCING APPARATUS

BACKGROUND OF THE INVENTION

The present invention relates to an editing circuit for a magnetic recording and reproducing apparatus capable of recording a video signal of a first scene already recorded on magnetic tape and then a video signal of a second scene supplied from outside.

In a conventional magnetic recording and reproducing apparatus having editing function (hereinafter referred to as VTR) using a known technique as described in JP-B-49-18805, for example, assembly editing for recording a video signal of a certain scene already recorded on magnetic tape (i.e., a video signal of a first scene) and then a video signal of another scene supplied from outside (i.e., a video signal of a second scene) is performed by precisely synchronizing the operation of the VTR to the video signal of the second scene at a joint between the video signal of the first scene and the video signal of the second scene so that the reproduced image may not be disturbed at the junction.

In the prior art, reproduced images are not disturbed at the joint between scenes. In such editing of the prior art, however, the video signal of the second scene is recorded in a moment at the last position of the video signal of the first scene. When video signals are reproduced from the edited magnetic tape to monitor images, therefore, the first scene is instantly switched to the second scene at the joint between the first scene and the second scene.

However, this results in only jointed scenes. In a television broadcast program, a fade in/fade out effect is provided in changing over scenes to produce a special effect at a joint. In VTR editing, however, attention is not paid to such effects. With the advance of multifunction VTRs in recent years, such attention is also needed.

SUMMARY OF THE INVENTION

In view of the above described points, an object of the present invention is to provide an editing circuit for magnetic recording and reproducing apparatus allowing editing which causes a fade in/fade out effect at a joint between scenes.

In order to achieve the above described object, according to one aspect of the present invention, an editing circuit for magnetic recording and reproducing apparatus according to the present invention includes memory means for storing the last one field (or one frame) set out of the video signal of the first scene which is recorded on magnetic tape, and operation or calculation processing means for adding output signals repetitively read out from the memory means and the video signal of the second scene supplied from the outside with ratios successively changed, the output signal of the operation processing being supplied to the above described magnetic tape as the recording signal.

According to another aspect of the present invention, the edition circuit for magnetic recording and reproducing apparatus includes switch means for switching from the video signal of the first scene reproduced from the magnetic tape to the video signal of the second scene supplied from outside, delay means having a delay time equivalent to one field (or one frame), subtraction means for applying subtraction processing to the output signal of the delay means and the output signal of the switch means, attenuation means for attenuating a difference signal supplied from the attenuation means, and addition means for adding the output of the attenuation means to the output signal of the switch means, the output signal of the addition means being supplied to the delay means and being used as the recording signal supplied to the magnetic tape concurrently with selection of the video signal of the second scene performed by the switch means.

A still picture signal representing the last picture of the first scene is obtained from the memory means. In the operation processing means, the still picture signal and the video signal of the second scene are added together so that the still picture signal may be successively attenuated and the video signal of the second scene may be successively increased. The output signal of the operation processing means is recorded from the last position of the video signal of the first scene on the magnetic tape. In images reproduced from the magnetic tape thus edited, the first scene fades out and the second scene fades in at the joint between the first scene and the second scene.

Further, in the operation processing means, the video signal of the first scene and the video signal of the second scene may also be processed so that the first scene may fade out and thereafter the second scene may fade in.

Further, when the video signal of the first scene reproduced from the magnetic tape is selected by the switch means, the delay means, the subtraction means, the attenuation means and the addition means function as means for removing noise components having no vertical correlation included in the video signal of the first scene. When the video signal of the second scene is selected by the switch means, the last field (or frame) of the video signal of the first scene is supplied from the delay means to the subtraction means to undergo subtraction processing together with the video signal of the second scene. A resultant difference signal is attenuated, added to the video signal of the second scene, and supplied to the subtraction means via the delay means. In the output signal of the addition means, therefore, the proportion of the field (or frame) representing the last image of the first scene is successively decreased while the proportion of the video signal of the second scene is increased. The output signal of the addition means is recorded from the last position of the video signal of the first scene on the magnetic tape. In the same way as the foregoing description, the first scene fades out and the second scene fades in at the joint between the first scene and the second scene.

Each of recent VTRs has a digital memory having a capacity of one field (or one frame) for the purpose of image processing as disclosed in NEC Technical Journal, Vol. 40, No. 3, 1987, pp. 49 to 52, for example. In the present invention as well, such a digital memory can be used as the memory means and delay means.

BRIEF DESCRIPTION OF THE DRAWINGS

FIGS. 9-A-B' are diagrams showing the editing operation of respective magnetic recording and reproducing apparatuses in the example of application illustrated in FIG. 8.

DESCRIPTION OF THE PREFERRED EMBODIMENTS

Embodiments of the present invention will now be described by referring to drawings.

Figure 1:
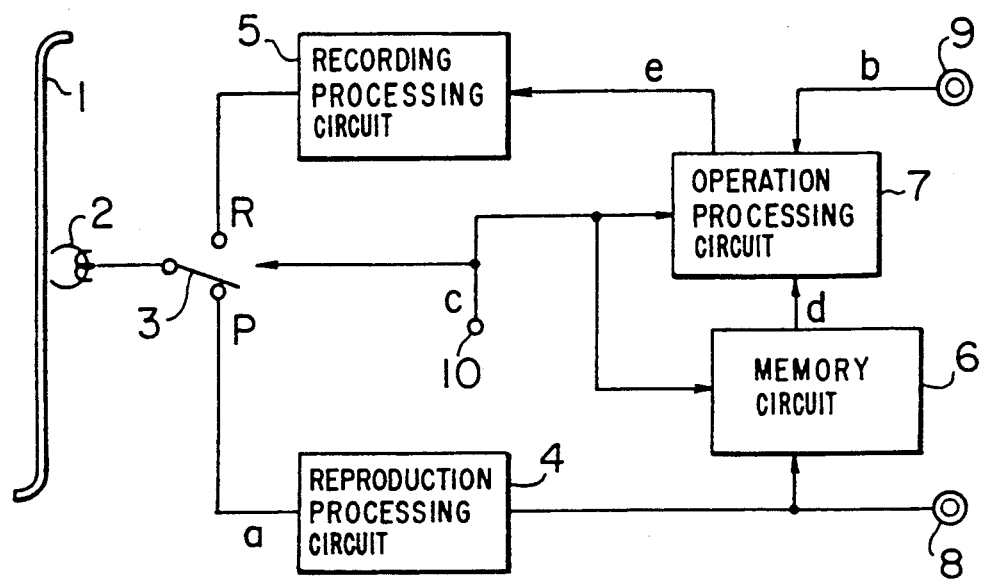
FIG. 1 is a block diagram showing an editing circuit for a magnetic recording and reproducing apparatus according to an embodiment of the present invention.

FIG. 1 is a block diagram showing an embodiment of an editing circuit for magnetic recording and reproducing apparatus according to the present invention. Numeral 1 denotes magnetic tape, 2 a video head, 3 a switch circuit, 4 a reproduction processing circuit, 5 a recording processing circuit, 6 a memory circuit, 7 an operation processing circuit, 8 an output terminal, and 9 and 10 input terminals.

In FIG. 1, the video signal of the first scene is already recorded on a part of the magnetic tape 1. In electronic editing of recording video signal of the first scene and then the video signal of the second scene, the reproduction mode is first established, and the last portion, for example, of the video signals of the first scene on the magnetic tape 1 is reproduced by the video head 2. A reproduced video signal a supplied from the video head 2 is passed through the switch circuit 3 closed to the p side to undergo reproduction processing such as amplification and demodulation in the reproduction processing circuit 4. The resultant signal is supplied to a monitor (not illustrated) through the output terminal and supplied to the memory circuit 6.

On the monitor, therefore, the first scene is displayed as images on the basis of the reproduced video signal a. If an image currently displayed is specified as the last image of the first scene by the user, the video signal of one field (or one frame) representing that image is written into the memory circuit 6. This memory circuit 6 includes an A-D converter, a semiconductor memory having a memory capacity of one field (or one frame), and a D-A converter. A portion of the reproduced video signal a of the first scene corresponding to the one field (or one frame) is written into the semiconductor memory as digital signals. The address signal of the semiconductor memory at this time is produced on the basis of the synchronization signal of the reproduced video signal a.

Succeedingly, the magnetic tape 1 is rewound by a predetermined amount. Thereafter, the magnetic tape 1 is so traveled that the recorded portion of the video signal a of the first scene may be scanned again by the video head 2. A video signal b of the second scene is inputted from the input terminal 9. When reproduction and scanning of a track on the magnetic tape 1 whereon the field (or frame) stored in the memory circuit 6 is recorded have been completed by the video head 2, a control signal c is inputted from the input terminal 10. Thereby, the switch circuit 3 is changed over to the R side to repetitively read out the video signals of one field (or one frame) stored in the memory circuit 6, and the operation processing circuit 7 is activated. At this time, the traveling phase of the magnetic tape 1 and the scanning phase of the video head 2 are synchronized to the synchronization signal of the video signal b of the second scene. Further, the address signal of the semiconductor memory in the memory circuit 6 is produced on the basis of the synchronization signal of the video signal b of the second scene. Therefore, a still picture signal d representing the last image of the first scene is outputted from the memory circuit 6. This still picture signal d is synchronized in phase to the video signal b of the second scene.

In the operation processing circuit 7, the video signal b of the second scene and the still picture signal d are added with predetermined proportions. These proportions are successively changed every field (or every frame), for example, so that the additional proportion of the still picture signal d may be successively decreased whereas the additional proportion of the video signal b of the second scene may be successively increased. As a result, the output video signal e of the operation processing circuit 7 is first the still picture signal d. However, the output video signal e is gradually switched from the still picture signal d to the video signal b of the second scene. The output video signal e is completely switched to the video signal b of the second scene in several frames to several ten frames.

The output video signal e of the operation processing circuit 7 undergoes recording processing such as modulation and amplification in the recording processing circuit 5 and is supplied to the video head 2 via the switch circuit 3 to be recorded onto the magnetic tape 1 in the wake of the video signals of the first scene.

When the magnetic tape 1 having the video signals of the first scene and the video signals of the second scene recorded thereon is reproduced, the first scene fades out and the second scene fades in at the joint between the first scene and the second scene, resulting in a fade in/fade out effect.

The memory circuit 6 may be so configured that the reproduced video signal a will be successively overwritten in the reproduction mode and upon the user's command the writing operation is stopped to store and hold the reproduced video signal of one field (or one frame) written lastly.

In an alternative scheme, the memory circuit 6 is brought into the writing state when the control signal c is inputted from the input terminal 10. The last image of the first scene is set by the user as described above and the magnetic tape 1 is rewound. Thereafter, the memory circuit 6 is switched from the write mode to the read mode when the control signal c is inputted from the input terminal 10 while the video signals of the first scene are being reproduced. In this case as well, the above described video signals of one field (or one frame) representing the last image of the first scene specified by the user are stored and held, and the still picture signal d is obtained by repetitively reading out them. A specific example of the memory circuit 6 thus operating will now be described by referring to FIG. 2.

Figure 2:
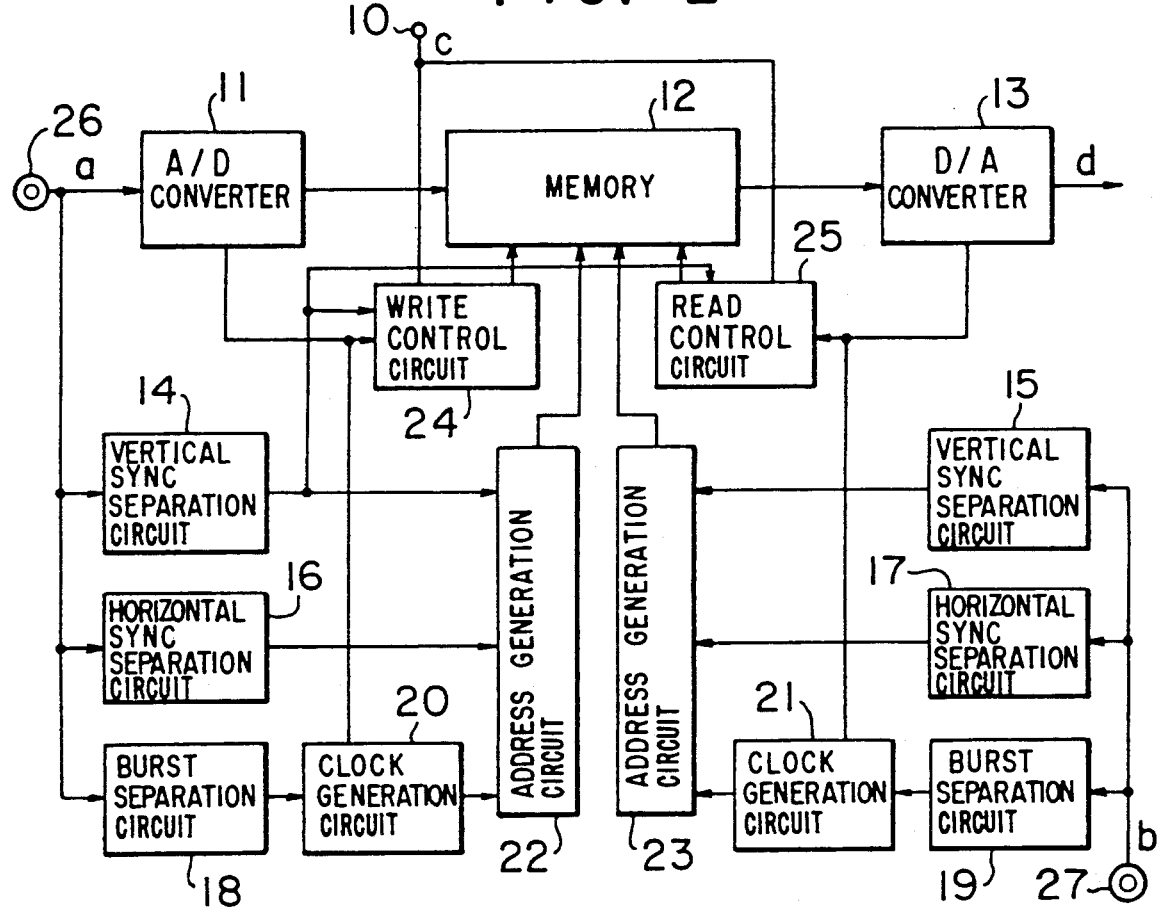
FIGS. 2 and 3 are block diagrams showing specific examples of a memory circuit illustrated in FIG. 1.

In FIG. 2, numeral 11 denotes an A-D converter, 12 a semiconductor memory having a memory capacity of one field (or one frame), 13 a D-A converter, 14 and 15 vertical synchronization separation circuits, 16 and 17 horizontal synchronization separation circuits, 18 and 19 burst separation circuits, 20 and 21 clock generation circuits, 22 and 23 address generation circuits, 24 a write control circuit, 25 a read control circuit, 26 and 27 input terminals.

Before the control signal c is inputted from the input terminal 10 as shown in FIG. 2, the write control circuit 24 is in the operation state whereas the read control circuit is in the nonoperation state and the semiconductor memory is in the write mode.

The reproduced signal a of the first scene inputted from the reproduction processing circuit 4 (FIG. 1) to the input terminal 26 is supplied to the A-D converter 11 and supplied to the vertical synchronization separation circuit 14 to produce a separated vertical synchronization signal. In addition, the reproduced video signal a is also supplied to the horizontal synchronization separation circuit 16 to produce a separated horizontal synchronization signal and further supplied to the burst separation circuit 18 to produce a separated burst signal. This burst signal is supplied to the clock generation circuit 20 to form consecutive write clocks having a frequency of 4 $f_{sc}$ (where $f_{sc}$ is the frequency of the burst signal and hence the frequency of the color subcarrier of the reproduced video signal a of the first scene). This write clock is supplied to the address generation circuit 22 and the write control circuit 24 and supplied to the A-D converter 11 as a sampling clock.

In the A-D converter 11, the reproduced video signal a is sampled by the sampling clock having a frequency of 4 $f_{sc}$ and converted into a digital form with 8 bits, for example. The reproduced digital video signal outputted from the A-D converter 11 is supplied to the semiconductor memory 12.

On the other hand, the address generation circuit 22 is controlled by the vertical synchronization signal supplied from the vertical synchronization separation circuit 14 and the horizontal synchronization signal supplied from the horizontal synchronization separation circuit 16. The address generation circuit 22 generates a write address signal having a value which is successively changed whenever the write clock is supplied from the clock generation circuit and which is returned to the original value whenever each field (or each frame) of the reproduced video signal a is started. At timing of the write control signal supplied from the write control circuit 24, each sample data of the reproduced digital video signal supplied from the A-D converter 11 is written into an address of the semiconductor memory 12 specified by the above described address signal. In this case, a first address of the semiconductor memory 12 is specified for a first sampling data of each field (or each frame) of the reproduced digital video signal. Therefore, successive sample data of each field (or each frame) are written into successive addresses of the semiconductor memory 12 beginning with the first address.

When the control signal c is inputted from the input terminal 10, the write control circuit 24 is brought into the nonoperation state by a vertical synchronization signal supplied from the vertical synchronization separation circuit 14 immediately after that control signal c, and the read control circuit 25 starts its operation. Therefore, the digital video signal outputted from the A-D converter 11 corresponding to one field (or one frame) remains stored in the semiconductor memory 12. At this time, the video signal b of the second scene inputted at the input terminal 9 (FIG. 1) is inputted from the input terminal 27 and supplied to the vertical synchronization separation circuit 15 to produce a separated vertical synchronization signal. The video signal b is also supplied to the horizontal synchronization separation circuit 17 to produce a horizontal synchronization signal and supplied to the burst separation circuit 19 to produce a separated burst signal.

This burst signal is supplied to the clock generation circuit 21. Consecutive read clocks having a frequency of 4 $f_{sc}'$ (wherein $f_{sc}'$ is the frequency of the burst signal and hence the color subcarrier of the video signal b of the second scene) are thus formed. These read clocks are supplied to the address generation circuit 23, the read control circuit 25, and the D-A converter 13.

The address generation circuit 23 is controlled by the vertical synchronization signal supplied from the vertical synchronization separation circuit 15 and the horizontal synchronization signal supplied from the horizontal synchronization separation circuit 17. The address generation circuit 23 generates a read address signal having a value which successively changes whenever the read clock is supplied from the clock generation circuit 21 and which returns to its original value of each field (or each frame) of the video signal b of the second scene supplied from the input terminal 27. At timing of the read control signal supplied from the write control circuit 25, each sample data of the digital video signal is read out from the address of the semiconductor memory 12 specified by the above described read address signal. In this case, the first address of the semiconductor memory 12 is specified at the start of each field (or each frame) of the video signal b of the second scene. For every field (or every frame) of the video signal b of the second scene, therefore, data are read out from the semiconductor memory 12 successively beginning from the first address. In synchronism with the video signal b of the second scene in phase, therefore, the digital video signal of one field (or one frame) stored in the semiconductor memory 12 is repetitively read out.

The output signal of the semiconductor memory 12 is converted into an analog signal by the D-A converter 13. The still picture signal d representing the final image of the first scene is thus obtained. This still picture signal d is supplied to the calculation processing circuit 7 of FIG. 1.

Figure 3:
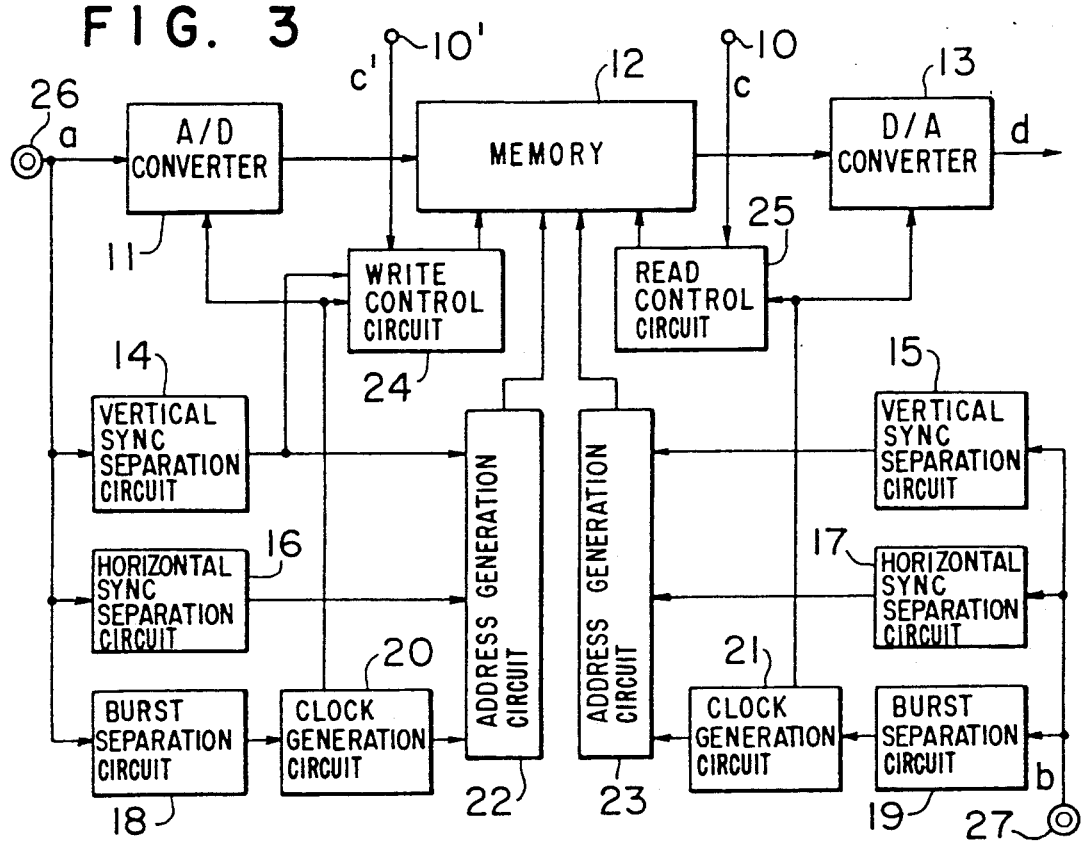

FIG. 3 is a block diagram showing another specific example of the memory circuit 6 illustrated in FIG. 1. Numeral 10' denotes an input terminal. Components corresponding to those of FIG. 2 are denoted by identical symbols and will not be described repeatedly.

In FIG. 3, the control signal c inputted from the input terminal 10 is supplied to only the read control circuit 25. A write command signal c' generated by user's manipulation, for example, is supplied from the input terminal 10' to the write control circuit 24. When this write command signal c' is supplied, the write control circuit 24 writes one field (or one frame) of the reproduced digital video signal outputted from the A-D converter 11 into the semiconductor memory 12 on the basis of the vertical synchronization signal supplied from the vertical synchronization separation circuit 14.

Or a write stop signal c' may be supplied from the input terminal 10'. In this case, the semiconductor memory 12 is brought into the write mode by the write control circuit 24 in the same way as the specific example shown in FIG. 2. When the write stop signal c' is supplied from the input terminal 10', the write control circuit 24 stops writing data into the semiconductor memory 12 on the basis of the vertical synchronization signal supplied from the vertical synchronization separation circuit 14 immediately after the write stop signal c'. As a result, one field (or one frame) of the reproduced digital video signal immediately before the write stop remains stored in the semiconductor memory 12.

In either case, one field (or one frame) representing the last image of the video signal b of the first scene is thus stored in the semiconductor memory 12. When the control signal c is thereafter inputted from the input terminal 10, repetitive readout from the semiconductor memory 12 is performed in the same way as the specific example described with reference to FIG. 2. The still picture signal d is thus obtained from the D-A converter 13.

If the memory circuit 6 of FIG. 1 is configured as shown in FIG. 3, the last image of the first scene is stored into the memory circuit 6 when the last image is defined by the user on the monitor.

Figure 4:
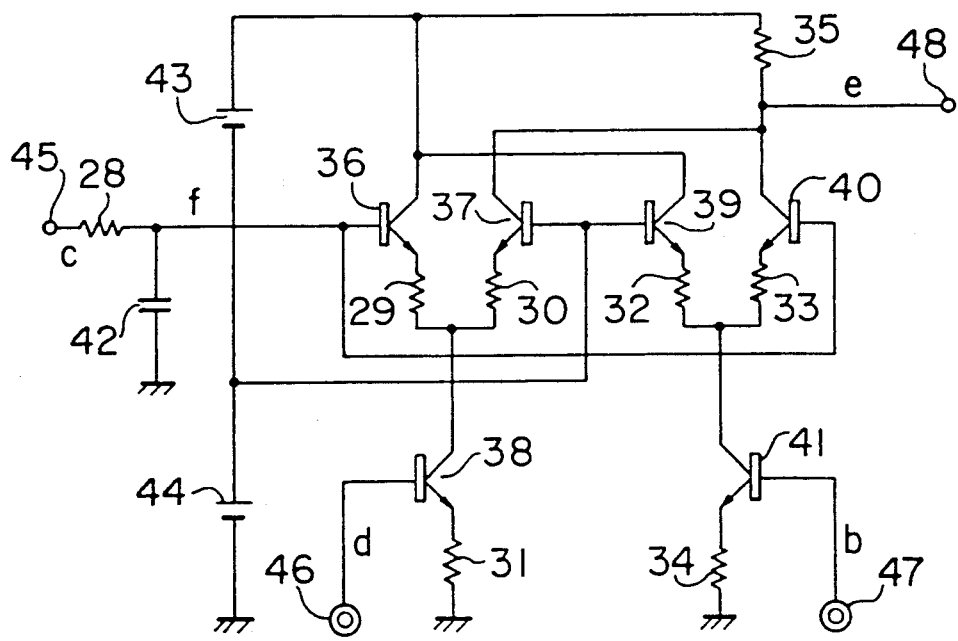
FIGS. 4 and 5 are circuit diagrams showing specific examples of an operation processing circuit illustrated in FIG. 1.

FIG. 4 is a circuit diagram showing an embodiment of the operation processing circuit 7 of FIG. 1. Numerals 28 to 35 denote resistors, and numerals 36 to 41 denote transistors. Numeral 42 denotes a capacitor. Numerals 43 and 44 denote reference voltage sources and numerals 45 to 47 denote input terminals, whereas numeral 48 denotes an output terminal.

In FIG. 4, the transistors 36 and 37 and the resistors 29 and 30 respectively connected to emitters of the transistors 36 and 37 constitute a differential changeover circuit. Both the resistor 29 and the resistor 30 are connected to the collector of the transistor 38, which constitutes a common emitter amplification circuit in conjunction with the emitter resistor 31. The still picture signal d is supplied from the memory circuit 6 (FIG. 1) to the base of this transistor 38 via the input terminal 46. In the same way, the transistors 39 and 40 and the resistors 32 and 33 respectively connected to the emitters of the transistors 39 and 40 constitute a differential changeover circuit. Both the resistor 32 and the resistor 33 are connected to the collector of the transistor 41, which constitutes a common emitter amplification circuit in conjunction with the emitter resistor 34. The video signal b of the second scene is supplied from the input terminal 9 (FIG. 1) to the base of the transistor 41 via the input terminal 47.

Collectors of the transistors 36 and 39 are connected to the reference voltage source 43. Collectors of the transistors 37 and 40 are connected together to the output terminal 48 and further connected to the reference voltage source 43 via the load resistor 35. Bases of the transistors 37 and 39 are supplied with predetermined bias voltage by the reference voltage sources 43 and 44. Further, bases of the transistors 36 and 40 are connected to the input terminal 45 via a low-pass filter comprising the resistor 28 and the capacitor 42. This input terminal 45 is supplied with the control signal c fed from the input terminal 10 of FIG. 1.

Operation of this specific example will now be described.

When the input terminal 45 is not supplied with the control signal c, the input terminal 45 is at its "L" level (low level), and hence the base potential of the transistors 36 and 40 is so set as to be sufficiently lower than the base potential of the transistors 37 and 39. Therefore, the transistors 36 and 40 are in the off-state, whereas the transistors 37 and 39 are in the on-state.

Under this state, the still picture signal d is not inputted from the input terminal 46. Even if the video signal b of the second scene is inputted from the input terminal 47, the resultant current flows through only the transistor 39, the resistor 32, the transistor 41 and the resistor 34, and does not flow through the load resistor 35. Accordingly, the video signal is not obtained at the output terminal 48.

When the control signal c is inputted at the input terminal 45, the still picture signal d is inputted from the memory circuit 6 (FIG. 1) to the input terminal 46 as described before. It is now assumed that the control signal c is a signal of "H" (high level). In the low-pass filter comprising the resistor 28 and the capacitor 42, the control signal c is converted to base voltage f having a level which rises successively from the rising edge of the control signal c in accordance with the time constant of the low-pass filter. The resultant base voltage f is supplied to the bases of the transistors 36 and 40. The base voltage f is finally saturated to a fixed high level. However, the level of the voltage applied to bases of the transistors 37 and 39 is so set as to be a middle value of the base voltage f, for example.

Immediately after the control signal c is inputted at the input terminal 45, the level of the base voltage f is sufficiently low, and hence nearly only the transistor 37 and 39 are in the on-state. Only the current generated by the still picture signal, which is supplied from the input terminal 46, flows to the load resistor 35 through the transistor 37, the resistor 30, the transistor 38 and the resistor 31. The video signal e obtained at the output terminal 48 comprises nearly only the still picture signal d.

As the level of the base voltage f is raised, however, the base potential of the transistors 36 and 40 also rises and a part of the current flowing through the transistor 38 begins to flow through the transistor 36. As this current increases, the current flowing through the transistor 37 decreases. In addition, a part of the current flowing through the transistor 34 also begins to flow through the transistor 40 and its proportion gradually increases. As a result, a current synthesized from the currents flowing through the transistors 37 and 40 flows through the load resistor 35. Therefore, the video signal e obtained at the output terminal 48 becomes a sum signal of the still picture signal d and the video signal b of the second scene. When the base voltage f is at the low level, the proportion of the still picture signal d in the video signal e is large. As the level of the base voltage f rises, however, the current flowing through the transistor 37 decreases and the current flowing through the transistor 40 increases. In the video signal e, the proportion of the still picture signal d decreases and the proportion of the video signal b of the second scene increases. When the level of the base voltage f is saturated, the transistors 37 and 39 turn off, and currents flow through only the transistors 36 and 40. Therefore, the video signal e obtained at the output terminal 48 comprises only the video signal b of the second scene.

The time taken for the video signal obtained at the output terminal 48 to completely become the video signal b of the second scene since the application of the control signal c depends on the time constant of the low-pass filter comprising the resistor 28 and the capacitor 42, and is so set as to be a value between several frames and several ten frames.

Figure 5:
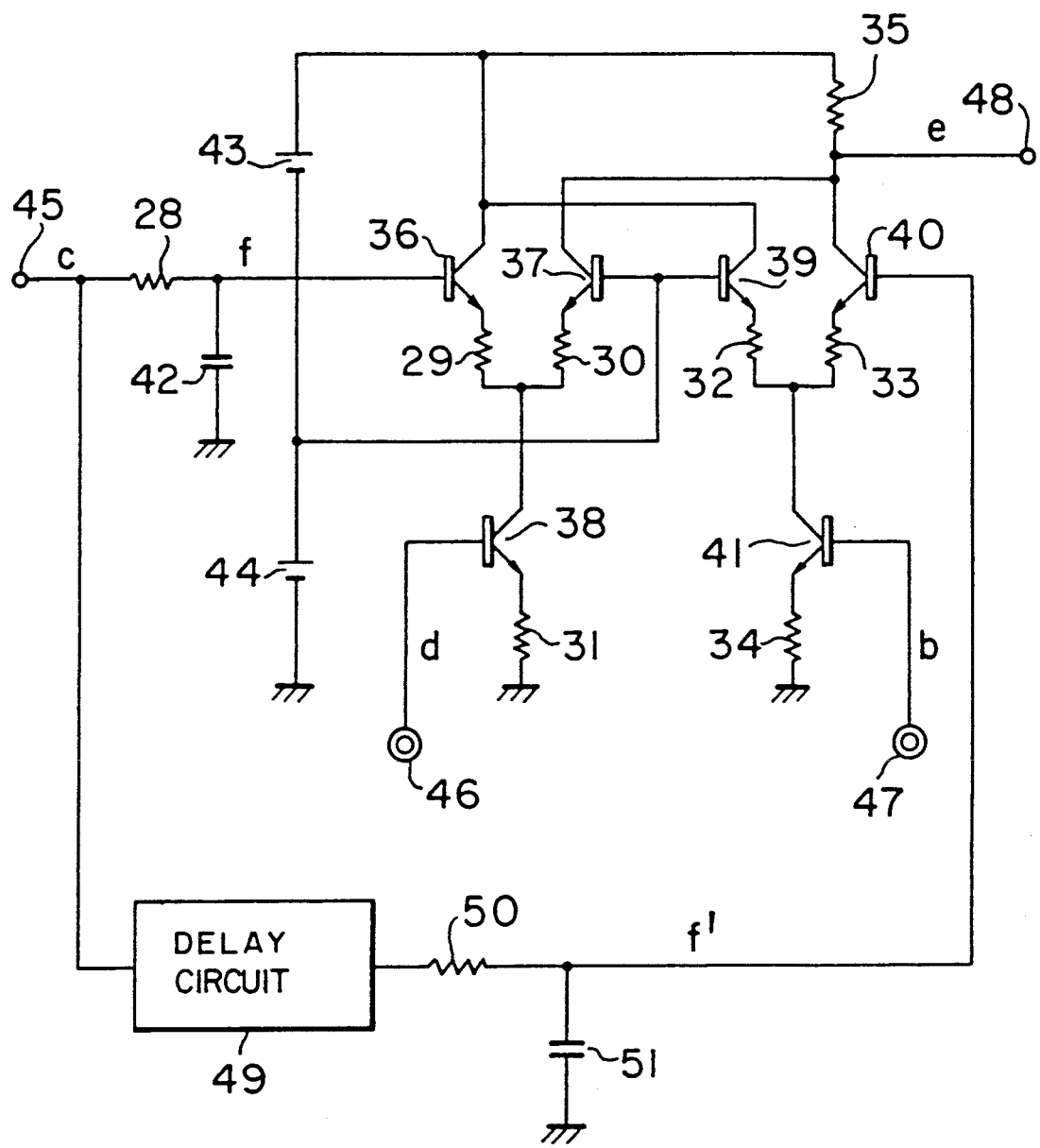

FIG. 5 is a circuit diagram showing another specific example of the operation processing circuit 7 illustrated in FIG. 1. Numeral 49 denotes a delay circuit, 50 a resistor, and 51 a capacitor. Components corresponding to those of FIG. 4 are denoted by identical symbols and will not be described repeatedly.

In the example shown in FIG. 4, the video signal b of the second scene fades in at the same time that the still picture signal d fades out. However, the specific embodiment shown in FIG. 5 is so configured that the video signal b of the second scene may fade in after the still picture signal d fades out.

In FIG. 5, the control signal c inputted from the input terminal 45 is supplied to the low-pass filter comprising the resistor 28 and the capacitor 42. The base voltage f having a level which successively rises is thus formed. Further, this control signal is delayed by the delay circuit 49 and then supplied to a low-pass filter comprising the resistor 50 and the capacitor 51. As a result, base voltage f' having a level successively raised is formed. The base voltage f is applied to the base of the transistor 36, whereas the base voltage f' is applied to the base of the transistor 40.

First of all, therefore, the base potential of the transistor 36 rises on the basis of the base voltage f, and hence the current flowing through the transistor 37 on the basis of the still picture signal d gradually decreases. Accordingly, the level of the video signal e obtained at the output terminal 48 comprising only the still picture signal d is gradually lowered, fading out being performed. When the delay time of the delay circuit 49 has elapsed after the control signal c is inputted at the input terminal 45, the base voltage f' is applied to the transistor 40, and the base potential gradually rises. As a result, the current flowing through the transistor 40 on the basis of the video signal b of the second scene gradually increases, and the level of the video signal e obtained at the output terminal 48 gradually rises, fading in of the video signal b of the second scene being performed.

If the delay time of the delay circuit 49 is so set as to be equivalent to the time required for the base voltage f to become saturated or nearly saturated since the application of the control signal c to the input terminal 45, the video signal of the second scene fades in after the still picture signal fades out in the video signal e obtained at the output terminal 48.

In this specific example, the delay time of the delay circuit 49 may be so set as to be equal to the time taken for the base voltage f to be saturated since the application of the control signal c to the input terminal 45. And the time constant of the low-pass filter comprising the resistor 50 and the capacitor 51 may be equal to or different from the time constant of the low-pass filter comprising the resistor 28 and the capacitor 42. Further, the base voltage f may be delayed by the delay circuit 49 and applied to the base of the transistor 40.

Further, in the specific examples shown in Figs. 4 and 5, the video signal e obtained at the output terminal 48 has an inverted polarity as compared with the still picture signal d and the video signal b of the second scene. As occasion demands, however, the video signal e may have the same polarity as those signals by adding an inversion circuit.

Figures 6, 7:
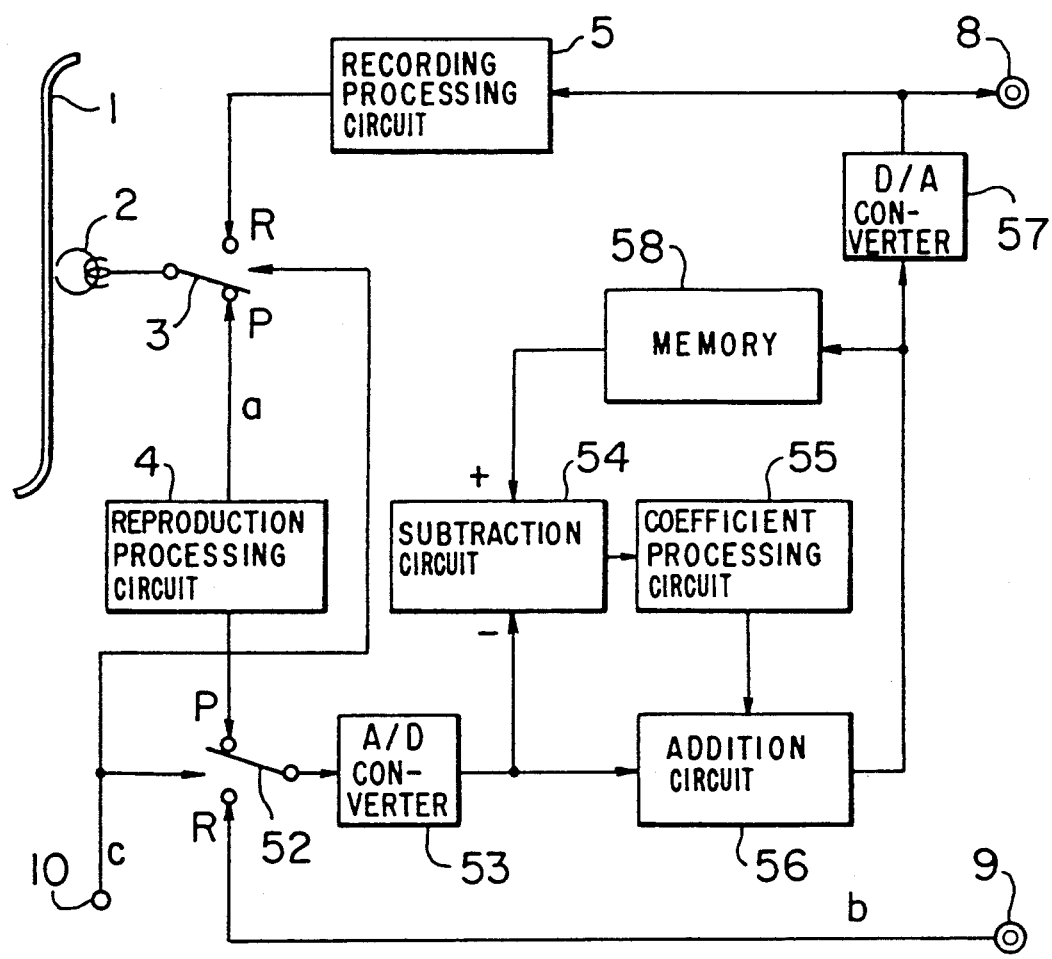
FIG. 6 is a block diagram showing an editing circuit for magnetic recording and reproducing apparatus according to another embodiment of the present invention.
FIG. 7 is a diagram showing an example of fade out/fade in effect obtained in the embodiment shown in FIG. 6.

FIG. 6 is a block diagram showing another embodiment of an editing circuit for magnetic recording and reproducing apparatus according to the present invention. Numeral 52 denotes a switch circuit, 53 an A-D converter, 54 a subtraction circuit, 55 a coefficient processing circuit, 56 an addition circuit, 57 a D-A converter, and 58 a memory. Components corresponding to those of FIG. 1 are denoted by identical symbols.

In FIG. 6, the memory 58 has a memory capacity of one field (or one frame) and functions as delay means of one field (or one frame). In reproduction, the memory 58 constitutes a noise reducer utilizing correlation between fields (or frames) in conjunction with the subtraction circuit 54, the coefficient processing circuit 55 and the addition circuit 56.

That is to say, the switch circuits 3 and 52 are closed to p sides in reproduction operation. In this case, the video signal b reproduced from the magnetic tape 1 by the video head 2 passes through the switch circuit 3 and undergoes processing in the reproduction processing circuit 4. The video signal b is then supplied to the A-D converter 53 via the switch circuit 52, resulting in a reproduced digital video signal. This reproduced digital video signal is supplied to the subtraction circuit 54 and supplied to the addition circuit 56 to be added to the output signal of the coefficient processing circuit 55. The resultant sum is delayed by one field (or one frame) in the memory 58 and is supplied to the subtraction circuit 54. In the subtraction circuit 54, a noise component having no correlation between fields (or frames) is detected. This noise component is multiplied by an appropriate coefficient k and attenuated in the coefficient processing circuit 55. The noise component thus attenuated is supplied to the addition circuit 56 and added to the reproduced digital video signal so as to subtract the noise component from the reproduced digital video signal supplied from the A-D converter 53.

The reproduced digital video signal with the noise component thus removed in the addition circuit 56 is converted into an analog signal by the D-A converter 57 and then outputted from the output terminal 8.

In editing operation, the reproduction mode is first established, and the video signal a of at least an end portion of the first scene on the magnetic tape 1 is reproduced. The reproduced video signal which has undergone the noise component removing processing as described above is supplied from the output terminal 8 to a monitor (not illustrated), the first scene being displayed.

After the last image of the first scene is defined on the monitor, the video signal a of the first scene is reproduced again in synchronism with the video signal b of the second scene supplied from the input terminal 9. At the same time that the field (or frame) of the last image is finished, the control signal c is inputted from the input terminal 10 to change over the switch circuits 3 and 52 to R sides.

As a result, the video signal b of the second scene, which has passed through the switch circuit 52, is converted into a digital form by the A-D converter 53 and then supplied to the subtraction circuit 54 and the addition circuit 56. At this time the field (or frame) of the defined last image of the reproduced video signal a of the first scene is read out in synchronism with the video signal b of the second scene and then supplied to the subtraction circuit 54. In the subtraction circuit 54, the video signal supplied from the A-D converter 53 is subtracted from the video signal read out from the memory 58. The resultant difference signal is attenuated by a factor of k in the coefficient in the coefficient processing circuit 55 and then supplied to the addition circuit 56.

Assuming that the video signal of the first scene read out from the memory 58 is a' and the video signal of the second scene is b, the difference signal outputted from the subtraction circuit 54 is represented as a'−b. Therefore, the output signal of the addition circuit 56 can be represented as $$b + k(a' - b) = ka' + (1-k)b.$$

This output signal is delayed by the memory 58 and supplied to the subtraction circuit 54 during the next field (or frame) interval of the video signal b of the second scene. Therefore, the output signal of the addition circuit 56 in this field (or frame) can be represented as $$b + k[\{ka' + (1-k)b\} - b] = k^2 a' + (1 - k^2)b.$$

In this way, the output signal of the addition circuit 56 is delayed by the memory 58 to undergo subtraction processing in the subtraction circuit 54 together with the next field (or frame) of the video signal b of the second scene. Therefore, the output signal of the addition circuit 56 for the i-th (i = 1, 2, 3, ...) field (or frame) of the video signal b of the second scene after inputting of the control signal c can be represented as $$k^i a' + (1 - k^i) b. \quad (1)$$

Assuming now that the coefficient k in the coefficient processing circuit 55 is 0.75, proportions of the video signals a' and b in the output signal of the addition circuit 56 become as shown in FIG. 7 on the basis of the expression (1). (The relation i = 0 represents a field (or frame) immediately preceding the inputting of the control signal c.) That is to say, the field (or frame) of the last image of the reproduced video signal a of the first scene is successively attenuated, whereas the video signal b of the second scene is successively increased.

The output signal of the addition circuit 56 is converted into an analog signal by the D-A converter 57. The resultant analog signal is supplied to the monitor via the output terminal 8. Concurrently therewith, the resultant analog signal is processed in the recording processing circuit 5 and then supplied to the video head 2 via the switch circuit 3 to be recorded onto the magnetic tape 1.

In this embodiment heretofore described as well, the video signal of the second scene is so recorded on the magnetic tape in the wake of the video signal of the first scene that the fade out/fade in effect may be obtained at the joint between the first scene and the second scene.

Application of the present invention where a reproduced video signal of a different VTR is recorded as the video signal of the second scene in the wake of the video signal of the first scene already recorded on the magnetic tape for the purpose of editing will now be described.

Figure 8:
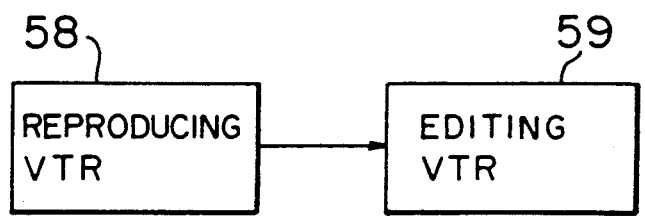
FIG. 8 is a diagram showing an example of application of the present invention.
Figure 8:
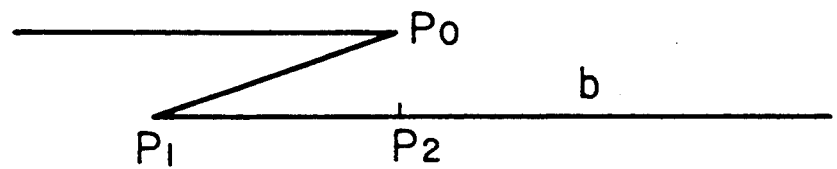
Figure 8:
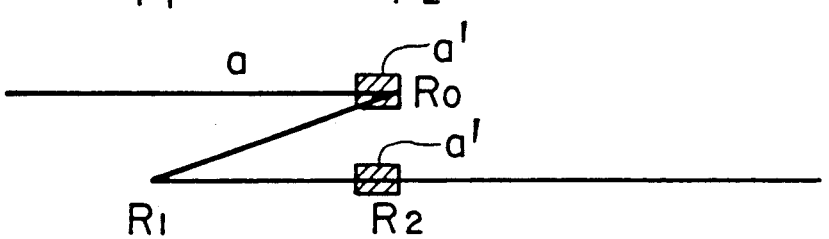
Figure 8:
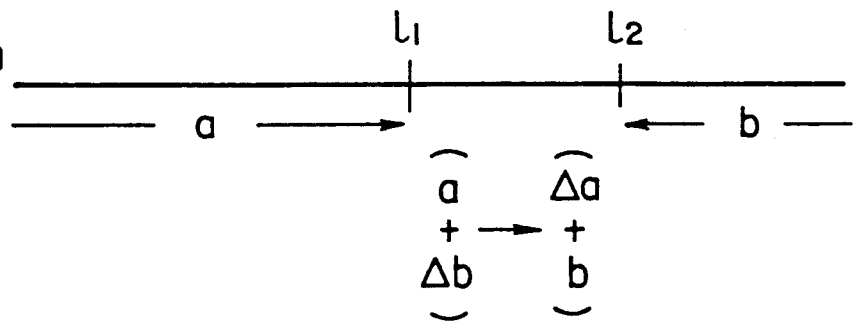

As shown in FIG. 8, a VTR (hereafter referred to as reproducing VTR) 58 equipped with magnetic tape having the video signal of the second scene recorded thereon is connected to a VTR (hereafter referred to as editing VTR) 59 equipped with magnetic tape having the video signal of the first scene. Editing function of both VTRs is set into the operation state.

As shown in FIG. 9(A), the reproducing VTR 58 is brought into the reproduction mode to monitor the reproduced image and define the start position ($P_0$) of the second scene. This definition is performed by manipulating a pause button. On the basis of this manipulation, the reproducing VTR 58 rewinds the magnetic tape by a predetermined amount and turns into the reproduction pause state.

As shown in FIG. 9(B), the editing VTR 59 is then brought into the reproduction mode. The resultant reproduced image is monitored, and the last position (a') of the first scene is defined ($R_0$). This definition is also performed by manipulating the pause button. As described before with the reference to the embodiment, the image at the last position is displayed as a still image. At this time, it is also possible to configure the embodiment shown in FIG. 1 so that the video signal of one field (or one frame) representing the still picture may be written into the memory circuit 6. In the same way as the conventional VTR, alteration and fine adjustment of the last position can be performed by using the same method as the alteration and fine adjustment of the still picture. After the last position of the first scene is defined, a recording button is manipulated. In the editing VTR 59, therefore, magnetic tape is rewound by an amount equivalent to the amount of rewinding of magnetic tape in the rewinding VTR 58. The editing VTR 59 then turns into the recording pause state, and the magnetic tape is stopped.

As a result of operation heretofore described, the reproducing VTR 58 is brought into the reproduction pause state (as indicated by $P_1$ of FIG. 9(A)), and the editing VTR 59 is brought into the recording pause state (as indicated by $R_1$ of FIG. 9(B)). At the same time when pause release manipulation is performed on the editing VTR 59, the reproducing VTR 58 is switched to the reproduction mode, and the editing VTR 59 is switched to the recording mode. And each magnetic tape begins to travel. However, the editing VTR 59 does not perform recording. In FIG. 1, the switch circuit 3 is closed to the p side. In FIG. 6, the switch circuits 3 and 52 are closed to p sides. As a result, the VTR 58 is synchronized to the VTR 59.

Thereafter, the magnetic tape of the reproducing VTR 58 arrives at the defined top position of the second scene (as indicated by $P_2$ of FIG. 9(A)). At the same time, the magnetic tape of the editing VTR 59 arrives at the position of the defined last image a' of the first scene (as indicated by $R_2$ of FIG. 9(B)). At this time, the control signal c is generated in the editing VTR 59 and inputted from the input terminal 10 of FIGS. 1 and 6. In the editing VTR 59, therefore, the switch circuit 3 is changed over to the R side in case of FIG. 1 and the switch circuits 3 and 52 are changed over to the R sides in case of FIG. 6. In addition, recording signals are formed under the condition that the last field (or frame) of the video signal of the first scene fades out and the video signal of the second scene fades in as described before. Recording is started from the defined last position of the video signal of the first scene on the magnetic tape of the editing VTR 59. After the elapse of several frames or several ten frames, the video signal of the first scene is completely switched to the video signal of the second scene, and the video signal of the second scene is then recorded.

FIG. 9(B)' shows the recording state on the magnetic tape of the editing VTR 59 obtained after the editing operation. In FIG. 9(B)', $l_1$ represents the last position of the video signal of the first scene, and $l_2$ represents a position whereat the video signal of the first scene is completely changed over to the video signal a of the second scene. Between the positions $l_1$ and $l_2$, the video signal a fades out and the video signal b fades in. The video signal a of the first scene is successively decreased to $\Delta a$, whereas the video signal b of the second scene is successively increased from $\Delta b$.

When the video signal of the second scene is to be recorded after the video signal of the first scene, the present invention heretofore described makes it possible to perform editing and recording so that the first scene may fade out and the second scene may fade in at the joint between the first scene and the second scene, resulting in special effects at joints between scenes.

What is claimed is:

1. An editing circuit for a magnetic recording and reproducing apparatus for recording a first video signal of a first scene recorded on a magnetic tape and a second video signal of a second scene in succession on the magnetic tape, comprising:

a recording/reproducing video head for recording and reproducing a video signal on a magnetic tape;

switching means electrically connected to said video head for switching said video head between a reproducing operation mode, wherein said switch means receives a signal from said video head and a recording operation mode, wherein said switch means delivers a signal to said video head;

memory means for storing therein a last field of said first video signal of said first scene reproduced by said video head, when said video head means is in the reproducing operation mode; and operation processing means, having a first input terminal connected to said memory means and a second input terminal for receiving a second video signal of a second scene, for adding a still picture signal corresponding to said last field read out from said memory means and said second video signal of said second scene in varying proportions to provide an addition signal, and having an output terminal electrically connected to said switch means for delivering said addition signal to said video head means via said switch mean so that said video head, when in the recording operation mode, records said addition signal on said magnetic tape in succession to said last field of the first video signal of said first scene, whereby said first scene fades out and said second scene fades in at a joint between said first and second scenes.

2. An editing circuit for magnetic recording and reproducing apparatus according to claim 4, wherein said operation processing means outputs an output signal of said memory means while successively attenuating it and thereafter outputs said second video signal of said second scene while successively increasing it so that said first scene fades out and thereafter said second scene fades in at the joint between said first scene and said second scene.

3. An editing circuit for magnetic recording and reproducing apparatus for recording a first video signal of a first scene recorded on a magnetic tape and a second video signal of a second scene in succession, comprising:

switch means for selecting said second video signal of said second scene concurrently with completion of a reproduction of a last field of said first video signal of said first scene;

delay means having a delay equivalent to one field;

subtraction means for subtracting an output signal of said switch means from an output signal of said delay means;

attenuation means for attenuating an output signal of said subtraction means; and addition means for adding an output signal of said attenuation means to the output signal of said switch means and supplying a resultant sum signal to said delay means, recording of an output signal of said addition means onto said magnetic tape being started concurrently with the start of selection of said second video signal of said second scene performed by said switch means so as to make said first scene fade out and make said second scene fade in at a joint between said first scene and said second scene.

4. An editing circuit for a magnetic recording and reproducing apparatus for recording a video signal with a pause, comprising:

memory means for storing therein a last field of a video signal being recorded on a magnetic tape immediately before occurrence of said pause;

means for rewinding said magnetic tape a predetermined length of tape;

means for phase-adjusting a control signal and a sync signal of a succeeding video signal to be recorded on said magnetic tape in succession to said last field of the video signal; and operation processing means, having a first input terminal connected to said memory means and a second input terminal for receiving said succeeding video signal, for adding said last field of the video signal read out from said memory means and said succeeding video signal in varying proportions to provide an addition signal, and having an output terminal for delivering said addition signal so that said addition signal is recorded on said magnetic tape in succession to said last field of the video signal with a cross-fading effect.

* * * * *